June 26, 1951   S. C. PRITCHARD   2,558,384
WHEEL AND AXLE FOR MODEL VEHICLES
Filed March 24, 1947
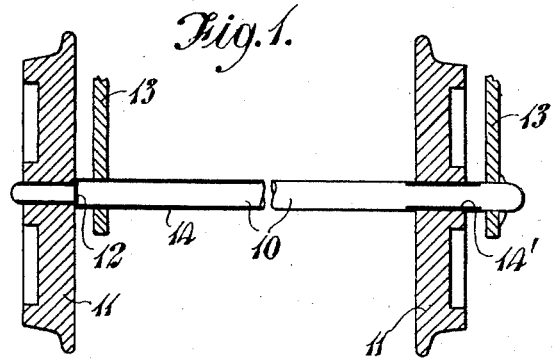
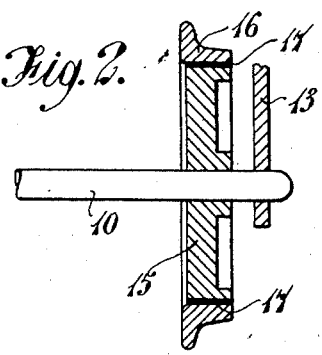 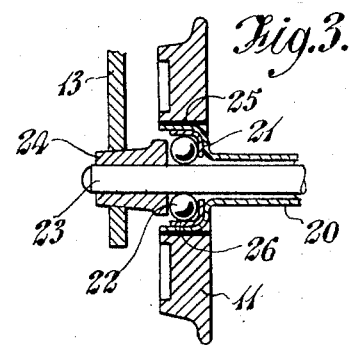
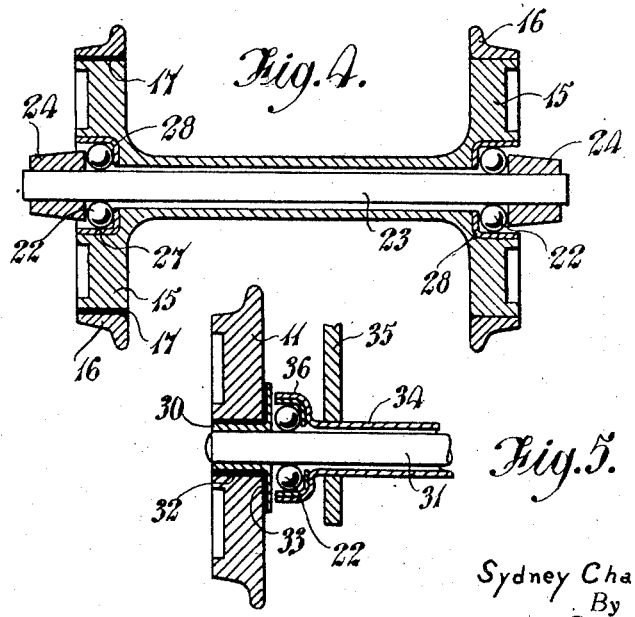
Inventor
Sydney Charles Pritchard
By
Emery, Holcombe & Blair
Attorney Patented June 26, 1951

2,558,384

UNITED STATES PATENT OFFICE 2,558,384

WHEEL AND AXLE FOR MODEL VEHICLES

Sydney Charles Pritchard, Seaton, England

Application March 24, 1947, Serial No. 736,668
In Great Britain March 25, 1946

15 Claims. (Cl. 295—43)

1

This invention relates to the construction of wheels, axles, and wheel and axle assemblies for model electric railway rolling stock.

In some model electric railways, the two running rails have to be insulated from one another and consequently the wheels on opposite sides of the locomotives, wagons, coaches and other vehicles running on said rails must also be insulated from one another in order to prevent the occurrence of a short-circuit. Hitherto such insulation has been effected by using wheels made of insulating material or, if metal wheels are used, by inserting in the wheel hubs insulating bushes made, for example, of ebonite or similar material. This is a difficult and expensive process particularly in the case of very small sized vehicles, for example of 00 gauge, apart from being unsatisfactory, as the bushes are liable to work loose in use and, like wheels made entirely of insulating material, cannot be secured on the axles with a tight force fit. Alternatively, axles of insulating material have been used, but these are objectionable due to their fragility, particularly in the smaller gauges, to their poor wearing properties, and to the fact that upon forcing the wheels on to the ends of the insulating axles the insulating material is pared off, thereby preventing the wheels from being a really force fit upon the axles. To overcome these objections, composite axles of metal and insulating material have been used, for example, by dividing the metal axles and bridging the gap therein by a sleeve of insulating material.

The present invention has for an object to provide an all-metal wheel and axle assembly which overcomes the foregoing disadvantages and can be manufactured cheaply by mass production methods, and in accordance with one aspect thereof, the invention consists in forming at one of the members constituting said assembly at least partly of aluminium which is anodised over at least that surface portion which engages another of said members so as thereby to produce electrical discontinuity between said two interengaging members.

Any reference to aluminium in this specification or the appended claims, is intended to include not only pure aluminium but also alloys of aluminium which are capable of being anodised.

The invention also provides a wheel and axle assembly for model electric railway rolling stock, comprising a pair of wheels mounted in spaced relationship on an axle member, all of the members constituting said assembly being made of metal and at least one of the members having an

2 area of anodised aluminium or aluminium alloy so positioned relatively to the track-engaging surfaces of the wheels as to produce electrical discontinuity between said track-engaging surfaces.

The invention further provides a wheel and axle assembly for model electric railway rolling stock, comprising a pair of wheels rigid with a spacing axle member, and a second axle member supporting said wheels and spacing axle member through the intermediary of bearing balls all of the members constituting said assembly being made of metal, and at least one of the wheels or the spacing axle member having an area of anodised aluminium or aluminium alloy so positioned relatively to the track-engaging surfaces of the wheels as to produce electrical discontinuity between said track-engaging wheel surfaces.

The invention also consists in the construction of an axle for use in model electric railway rolling stock for supporting a pair of metal track-engaging wheels, wherein said axle is made of aluminium or an aluminium alloy and has the surface thereof, or at least a surface portion over which one of the wheels is fitted, anodised.

The invention further provides a wheel for model electric railway rolling stock comprising a wheel body portion having a metal tyre secured by a force fit about said wheel body portion, the body portion being formed of aluminium or an aluminium alloy and having that surface about which the tyre is fitted, anodised.

In a still further arrangement according to the invention there is provided a wheel comprising a metal body portion having a track-engaging surface formed thereon, and a hub portion about which said wheel body portion is secured with a force fit so as to rotate as a unit, the hub portion being made of aluminium or an aluminium alloy and having that surface about which the body portion is fitted, anodised.

The invention also provides a method of manufacturing a wheel and axle assembly for model electric railway rolling stock having a pair of metal wheels secured in spaced relationship on an axle member with the track-engaging surfaces of the wheels insulated from one another, which consists in forming said axle member of aluminium or an aluminium alloy, anodising the surface of at least that portion of the axle member on which one of the wheels is to be mounted, and pressing the wheels on to the axle member with a force fit.

In a preferred form of the invention as applied to, for example, locomotive, wagon, coach or other model electric railway rolling stock in which the wheels are rigidly secured on axles mounted in plain internal or external bearings, either the axle or the body or hub portion of one of each pair of wheels is made, preferably entirely, of aluminium or aluminium alloy and is anodised on its outer surface so as to provide insulating conditions between the one wheel and the axle or between the body or hub portion and the surrounding electrically conducting wheel part. The anodising hardens the surface of the aluminium, and the wheel or wheel part may be pushed over the anodised surface with a force fit so as to hold tightly, while the track-engaging surfaces of the wheels are effectively insulated from one another by the insulating properties of the anodised surface. In the case of an axle made of aluminium, only one end thereof need be anodised. This is particularly suitable in the case of model locomotives where it is desired to use one of the running wheels for picking up the electric current.

The ends of the axles may be round or of the square or other regular cross-section. The axles may be plane or may be shouldered at the ends so as to locate the wheels at the correct spacing. The wheels may be secured on the shouldered ends of the axle by a retaining screw in the end of the axle, in which case the screw is, if necessary, also made of aluminium or an aluminium alloy and anodised. A sleeve of steel or other suitable material may be fitted over the axle between the wheels, or over the portions of the axle passing through the bearings, in order to improve the bearing surfaces.

In order that the invention may be more clearly understood and readily carried into effect, some embodiments of wheel and axle assemblies in accordance therewith will now be described with reference to the accompanying drawings. In said drawings:

Figures 1 and 2 are transverse sectional views illustrating the application of the invention to assemblies in which a pair of running wheels are rigidly secured to a rotatable supporting axle; whilst Figures 3, 4 and 5 are similar views showing the invention applied to assemblies in which the wheels are mounted for rotation relatively to the supporting axle by means of bearing balls.

Referring now to the drawings and firstly to Fig. 1 thereof, there is shown a wheel and axle assembly for miniature gauge electric railway rolling stock comprising an axle member 10 of aluminium or an aluminium alloy carrying at its opposite ends a pair of metal wheels 11. The wheels have a force fit on the axle member and the latter may, if desired, be shouldered as indicated at 12 to locate the wheels thereon. The assembly is adapted to be connected to the framework of a vehicle as by means of a bracket or brackets 13 engaging about the axle either between the wheels (as shown on the left-hand side of Fig. 1) or externally of the wheels (as shown on the right-hand side of Fig. 1).

In order to insulate the track-engaging surface of one wheel from that of the other, the surface of the aluminium axle 10 is anodised as illustrated at 14 by means of a heavy line. While it may be preferred to anodise the entire axle surface, nevertheless only that part with which one of the wheels 11 engages need be anodised, as illustrated by the numeral 14' at the right-hand side of Figure 1.

In a modification of the arrangement shown in Fig. 1, insulation of the track-engaging surfaces of the wheels from one another is effected by providing the anodised aluminium or aluminium alloy surface within one of the wheels. This modification is shown in Fig. 2, where the axle 10, which is preferably made from steel rod but which may otherwise be similar to that shown in Figure 1, has fitted thereon at its opposite ends a pair of wheels of which the one shown comprises an inner or body portion 15 and a tyre or rim portion 16. The wheel body portion 15 is in this embodiment made of aluminium or an aluminium alloy and the peripheral surface about which the tyre is fitted with a force fit is anodised as indicated at 17, thereby insulating the tyre 16 from the remainder of the assembly.

The tyre may be made of any suitable metal, such as nickel silver. The other wheel may also be made of any suitable metal, such as steel, and may have a nickel silver tyre fitted thereon. This arrangement embodying a steel axle and one tyre or rim-insulated wheel is particularly suitable for the driving wheel assemblies of locomotives, while that shown in Fig. 1 may be preferred for coaches, trucks and wagons.

In either of the arrangements shown in Figs. 1 and 2, the wheels may alternatively have an easy fit over the axles, being secured thereto as by screws, the latter, where insulation is to be effected, also being made of aluminium or an aluminium alloy and anodised.

In Figure 3 there is illustrated a wheel and axle assembly for model electric railway rolling stock in which the wheels 11, of which only one is shown, are rigidly connected together by a spacing axle member 20 of tubular form and having at each end thereof a cup-shaped portion 21 within which is arranged a group of bearing balls 22 running on the surface of a rod-like supporting axle member 23 which extends within the axle member 20. The axle member 23 carries a collar 24 at each end of which the respective groups of bearing balls are retained within the cup-shaped portions 21 of the spacing axle member, and the assembly is supported by means of brackets 13 engaging over said collars. The running wheels are in this case rigidly secured about the cup-shaped portions of the spacing axle member and in order to insulate these wheels from one another, said spacing axle member is made of aluminium or an aluminium alloy and has either the entire outer surface thereof or, as indicated at 25 by a heavy line, at least the external peripheral surface of one of the cup-shaped portions, anodised, thereby insulating the associated wheel from the spacing axle 20 and from the other wheel. For the purpose of ensuring a satisfactory working surface for each group of bearing balls, a steel cup 26 may, as shown, be fitted within each cup-shaped end of the spacing axle.

Figure 4 shows another type of wheel and axle assembly employing bearing balls. In this example, the wheel bodies 15 of the two wheels and the spacing axle member 20 are formed together as a single unit and are made of aluminium or an aluminium alloy. Each of the wheel bodies is fitted around its periphery with a nickel silver or other metal tyre 16 and in order to insulate the tyres from one another the peripheral surface of one wheel body around which the tyre is secured with a force fit is anodised as illustrated by the heavy line 17. An axial recess 27 is formed in the outer face of each of the wheels and accommodates a group of bearing balls 22 which run on the supporting axle 23, the balls being retained within said recess by tapered collars 24 crimped or otherwise secured on the ends of the supporting axle and engaging within brackets by which the assembly is attached to a vehicle chassis. A steel bearing cup 28 may, as shown, be fitted within each recess 27 to provide a good running surface for the bearing balls.

Figure 5 shows a still further embodiment in which the wheels are supported for rotation through the intermediary of groups of bearing balls 22. As illustrated, at least one of the wheels 11 is provided with a flanged hub portion 30 which is a force fit in the wheel and which has a force fit over a rod-like spacing axle member 31, both said wheel and the spacing axle being made of any suitable metal and the hub portion 30 of aluminium or an aluminium alloy. To insulate the wheels from one another the hub 30 is anodised along its outer peripheral surface and along the wheel-engaging surface of the flange, as indicated by the heavy lines 32 and 33. The wheel assembly is supported for rotation relatively to a tubular supporting axle member 34 which surrounds the spacing axle member 31 and is connected to the vehicle chassis as by means of internal plain bearing brackets 35, said member 34 being formed at each end with a cupshaped portion 36 between which and the spacing axle 31 is arranged a group of bearing balls 22.

The wheels or the wheel bodies or hubs may be formed by a turning or die-casting operation. The anodised surface of the particular member of the assembly by which the track-engaging surfaces of the wheels are insulated from one another retains its insulating properties even though said surface makes a tight force fit with another of the metal assembly members.

While particular embodiments of the invention have been described, it is to be understood that various modifications may be made within the scope of the appended claims. For example, either the supporting axles, or the wheels or parts thereof, may have a surface of aluminium or aluminium alloy applied thereto and anodised at least at that area where insulation is to be effected, said axle, wheel or wheel part being made of suitable material such as steel. An axle of such kind may be preferred where pin point bearings are used, the axle comprising, for example, a rod of hardened steel with a sleeve of aluminium or an aluminium alloy surrounding the rod, the wheels being forced over the anodised surface of the sleeve and the pointed ends of the rod extending from the sleeve. Alternatively, an axle rod made of aluminium or an aluminium alloy and anodised at least over that surface portion engaged by one of the wheels may have hardened steel points secured to its ends.

I claim:

1. An assembly of the class defined comprising a metal axle and a metal wheel secured therein with a force fit, one of said members being formed at least partly of aluminum which is anodised over at least that surface portion upon which the other of said members is forced so as to produce electrical discontinuity between said members.

2. An assembly of the class defined comprising an axle member made of aluminum and a pair of metal wheels mounted with a force fit in spaced relationship on said axle member, at least that surface portion of the axle member onto which one of the wheels is forced being anodised.

3. An assembly of the class defined comprising a metal axle member, and a pair of metal wheels mounted on said axle member in spaced relationship, at least one of said wheels comprising a wheel body portion made of aluminum and apertured to engage tightly over said axle, and a metal tyre portion secured with a force fit about the peripheral surface of said wheel body portion, the said peripheral surface of the wheel body portion being anodised.

4. An assembly of the class defined comprising a metal axle member and a pair of track-engaging metal wheels secured on said member in spaced relationship, at least one of said wheels comprising an outer wheel body portion having a peripheral track-engaging surface, and fitted with a force fit upon an inner hub portion apertured to fit tightly on said axle member, said hub portion being made of aluminium and being anodised at least over that surface area engaged by said wheel body.

5. An assembly of the class defined comprising a metal axle member and a pair of track-engaging wheels secured on said axle member in spaced relationship, at least one of said wheels comprising an inner portion secured to the axle member and an outer portion secured with a force fit about said inner portion, one of said wheel portions having an area of anodised aluminium extending entirely over that surface engaged by the other wheel portion.

6. An assembly of the class defined comprising a tubular metal axle member, a pair of metal wheels secured to said axle member in spaced relationship, a fixed metal supporting axle member extending within said tubular axle member and a series of bearing balls interposed between said tubular axle member and said supporting axle member adjacent each end of the assembly, said tubular axle member having an area of anodised aluminium extending over at least that surface portion engaged by one of the wheels so as to produce electrical discontinuity between the track-engaging surfaces of the wheels.

7. An assembly of the class defined comprising a tubular metal axle member, a pair of metal wheels secured to said axle member in spaced relationship, a fixed metal supporting axle member extending within said tubular axle member, and a series of bearing balls interposed between said two axle members adjacent opposite ends thereof, at least one of said wheels having an inner body portion and a peripheral tyre portion, the wheel body portion being formed of aluminium and anodised over that surface about which the tyre portion is fitted.

8. An assembly of the class defined comprising a tubular axle member, a pair of wheel bodies integral with said axle member, the axle member and the wheel bodies being made of aluminium, a supporting metal axle member extending within said tubular axle member and a series of bearing balls interposed between each of said wheel body portions and said supporting axle member, each of said wheel bodies carrying a peripheral track-engaging tyre portion and at least one of said wheel bodies being anodised over that surface about which the tyre is fitted.

9. An assembly of the class defined comprising a metal axle member, a pair of metal track-engaging wheels mounted on said axle member in spaced relationship, a supporting axle member surrounding said spacing axle member, and a series of bearing balls arranged between said axle members adjacent each end thereof, at least one of said wheels having an aluminium hub portion apertured to fit tightly over said spacing axle member and being anodised over at least that surface with which the wheel body engages.

10. Method of manufacturing a wheel and axle assembly for model electric railway rolling stock having a pair of metal wheels secured in spaced relationship on an axle member with the track-engaging surfaces of the wheels insulated from one another, comprising the steps of forming said axle of aluminium, anodising the surface of at least that portion of the axle member on which one of said wheels is to be mounted, and pressing the wheels on to the axle member with a force fit.

11. For use in model electric railway rolling stock, a track-engaging wheel comprising a body portion and a surrounding metal tyre portion secured with a force fit to said body portion, the body portion being formed of aluminium and anodised over that surface about which the tyre portion is fitted.

12. For use in model electric railway rolling stock, a track-engaging wheel comprising an inner flanged hub portion and an outer body portion secured about said hub portion, the hub portion being formed of aluminium and anodised over that surface area of the hub and flange portions engaged by the wheel body.

13. A wheel and axle assembly for model railway vehicles, comprising a metal track-engaging wheel member which is a force fit on a metal axle member, at least one of said members being made of aluminium which is anodised over at least that part of its surface which engages the other member.

14. A wheel and axle assembly for model railway vehicles, comprising a metal axle member having a portion with a peripheral surface upon which is secured, with a force fit, an annular metal wheel portion having a track-engaging rim, at least one of said portions being made of aluminium which is anodised over that part of its surface which is in force fit engagement with the other portion, so as thereby to produce electrical insulation between the track-engaging rim and the axle member.

15. For use in model electric railway rolling stock, a track-engaging wheel comprising an aluminium hub portion which is pressed with a force fit into an aperture in the centre of an outer wheel body portion, the hub being anodised over that part of its surface which is engaged by the wheel body portion.

SYDNEY CHARLES PRITCHARD.

REFERENCES CITED

The following references are of record in the file of this patent:

UNITED STATES PATENTS

| Number | Name | Date |
|---|---|---|
| 101,187 | Truesdell | Mar. 22, 1870 |
| 1,452,547 | Call | Apr. 24, 1923 |
| 1,526,127 | Flick | Feb. 10, 1925 |
| 2,124,953 | Oelkers | July 26, 1938 |
| 2,151,049 | Laing | Mar. 21, 1939 |
| 2,161,636 | Rankin et al. | June 6, 1939 |
| 2,171,923 | Fischer | Sept. 5, 1939 |